Figure 1:
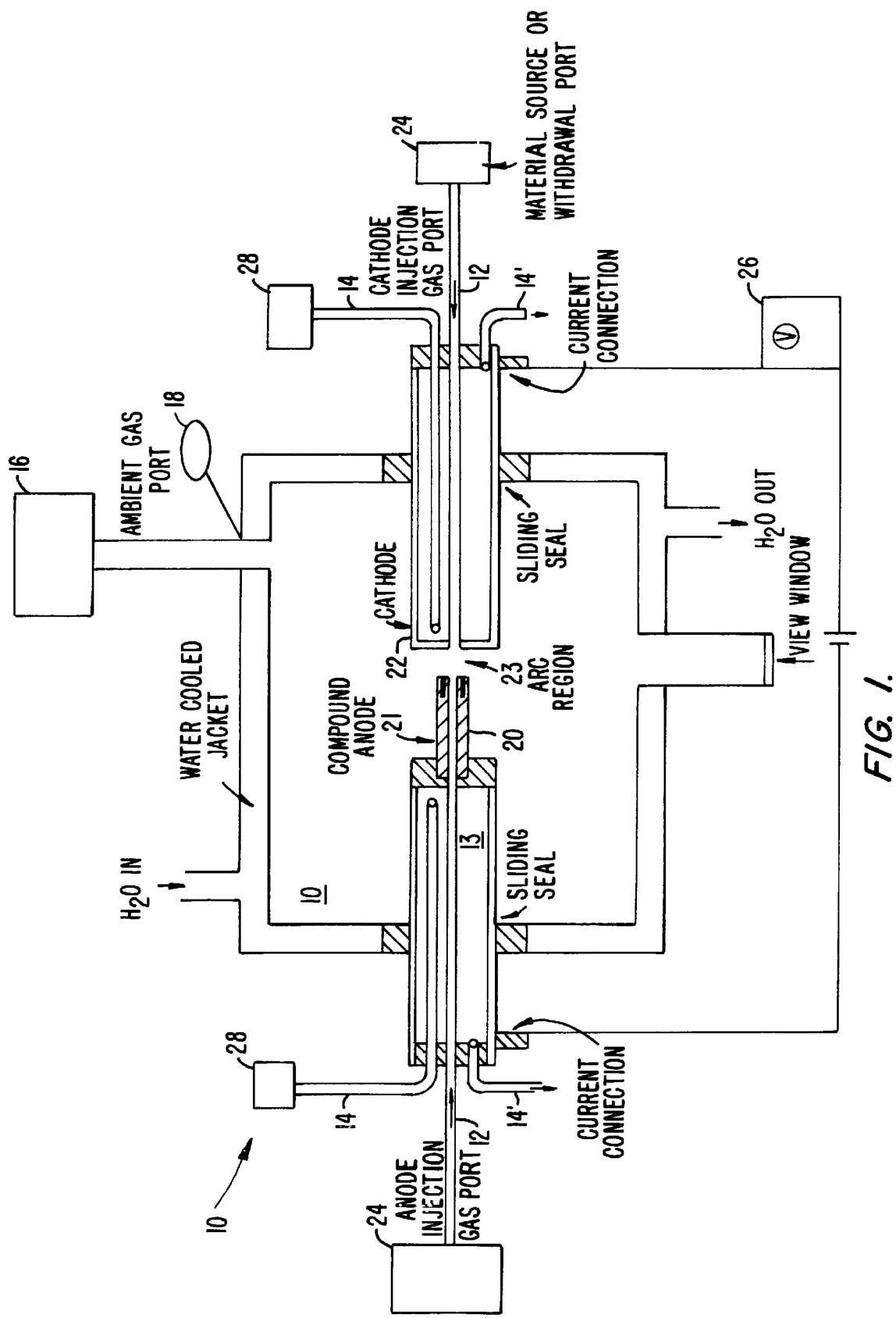

United States Patent [19]
Zettl et al.

[11] Patent Number: 6,063,243
[45] Date of Patent: May 16, 2000

[54] METHOD FOR MAKING NANOTUBES AND NANOPARTICLES

[75] Inventors: Alexander Karlwalter Zettl, Kensington; Marvin Lou Cohen, Piedmont, both of Calif.

[73] Assignee: The Regents of the Univeristy of California, Oakland, Calif.

[21] Appl. No.: 08/978,437

[22] Filed: Nov. 25, 1997

Related U.S. Application Data

[63] Continuation-in-part of application No. 08/388,494, Feb. 14, 1995, abandoned.

[51] Int. Cl.$^7$ .................................................. B01J 19/08
[52] U.S. Cl. ............................ 204/164; 204/173; 204/178
[58] Field of Search .................................. 204/166, 173, 204/178

[56] References Cited

U.S. PATENT DOCUMENTS 4,412,899 11/1983 Beale ...................................... 204/164
5,876,684 3/1999 Withers et al. ........................... 4/173

OTHER PUBLICATIONS

Ebesen et al., "Large–Scale Synthesis of Carbon Nanotubes"; Nature, vol. 358, Jul. 16, 1992. pp. 220–223.

*Primary Examiner*—Kishor Mayekar
*Attorney, Agent, or Firm*—Coudert Brothers

[57] ABSTRACT

The present invention is an apparatus and method for producing nano-scale tubes and particles. The apparatus comprises novel electrodes for use in arc discharge techniques. The electrodes have interior conduits for delivery and withdrawal of material from the arc region where product is formed. In one embodiment, the anode is optionally made from more than one material and is termed a compound anode. The materials used in the compound anode assist in the reaction that forms product in the arc region of the apparatus. The materials assist either by providing reaction ingredients, catalyst, or affecting the reaction kinetics. Among other uses, the inventive apparatus is used to produce nanotubes and nanoparticles having a variety of electrical and mechanical properties.

12 Claims, 2 Drawing Sheets

METHOD FOR MAKING NANOTUBES AND NANOPARTICLES

This application is a continuation-in-part of application Ser. No. 08/388,494, now abandoned filed Feb. 14, 1995.

This invention was made with U.S. Government support under Contract No. DE-AC03-76SF00098 between the U.S. Department of Energy and the University of California for the operation of Lawrence Berkeley Laboratory. The U.S. Government may have certain rights in this invention.

I. BACKGROUND OF THE INVENTION

1. Field of the Invention

This invention relates generally to nanotube fabrication and more specifically to manufacture of nanotubes containing boron, carbon and nitrogen.

2. Description of Related Art

Carbon tubes prepared by arc-discharge and having diameters on the order of nanometers have recently been synthesized. These tubes consist of cylindrical arrangements of carbon atoms. They can be produced in several ways, most commonly by arcing together two graphitic electrodes in a gas environment.

Carbon tubes can be synthesized in single-walled or multi-walled forms. The general apparatus for synthesis consists of an arc-discharge chamber. In the center of the chamber are two electrodes. The chamber is filled with a gas or gas mixture. An electric current is applied between the electrodes to form an arc. A deposit is formed inside the chamber which contains miniature carbon tubes. The deposit may be on one or both electrodes, and may also be on the inside walls of the chamber.

To optimize the yield or type of tubes desired, the type of electrodes, the type of gas, the nature of the current (a.c. or d.c.) and the voltage can be varied.

In general, the electrodes are made of graphite. They may also have dimples to hold metals to be vaporized, for example, iron. Or, they may have small cavity to be filled with either catalysts and/or graphite.

The type of gas and pressure inside the chamber affect the product synthesized. For example, 100 torr Argon was used to grow the first carbon tubes at the negative end of the electrode. S. Iijima, *Helical Microtubules of Graphitic Carbon*, Nov. 7, 1991, pp. 56–58, *Nature*, Vol. 354. Then, a mixture of 10 torr methane and 40 torr Argon was used to make single-shelled tubes with diameters of about one nanometer. S. Iijima and T. Ichihashi, *Single-Shell Carbon Nanotubes of 1-nm Diameter*, Jun. 17, 1993, pp. 603–604, *Nature*, Vol. 363. And, 100–500 torr Helium was used in cobalt catalyzed growth of carbon tubes with single-atomic-layer walls. D. S. Bethune, et al., *Cobalt-Catalyzed Growth of Carbon Nanotubes with Single-Atomic-Layer Walls*, Jun. 17, 1993, p. 605, *Nature*, Vol. 363.

The electric current depends on the size of the electrodes, their separation, and the gas pressure. It can be direct current (d.c.) or alternating current (a.c.), and has ranged from about 50 A to about 200 A for electrode diameters ranging from ¼" to over 1".

II. SUMMARY OF THE INVENTION

It is an object of this invention to provide an improved apparatus and method of synthesizing miniature particles and tubes having diameters on the order of nanometers. These nanoscale tubes and particles are termed "nanotubes" and "nanoparticles". In one example they are made substantially of carbon or of carbon combined with boron and/or nitrogen. In another example nanotubes and nanoparticles are made substantially of boron and nitrogen and contain less than about 1% carbon, or no carbon. The inventive apparatus is used to make nanotubes and nanoparticles comprised of many other materials as well.

The inventive apparatus comprises a chamber in which the ambient gas environment is controlled. At least two electrodes are located inside the chamber, and at least one of the electrodes has a hollow core, or conduit. Typically the two electrodes serve as an anode and a cathode. Most commonly, if only one of the electrodes has a hollow core, it is the anode. The electrodes have contacts for connection to a power source and are placed near one another so that when sufficient voltage is applied between them an arc forms in an arc region between them.

In one embodiment of the apparatus, the core of at least one of the electrodes has one or more sets of conduits. The conduits are used for any of several purposes, including for example, to inject gaseous, liquid, or particulate material from the electrode into the arc region. The injected material assists in producing novel nanoparticles and nanotubes comprised of compounds of layered $sp^2$-bonded $B_xC_yN_z$. The materials assist either by providing reaction ingredients, catalyst, or affecting the reaction kinetics. The conduits are also used to withdraw material from the arc region. The material withdrawn may be gases or particles used to produce new materials, so that the concentration of the gas or particles is controlled. The material withdrawn may also be newly formed material produced by the inventive apparatus. The conduits also provide a means to circulate a coolant in one or more of the electrodes so the electrode temperature is maintained within a desired range.

In another embodiment the inventive apparatus comprises a compound anode. The inventive compound anode comprises an electrically conducting material and a material that assists in producing novel nanoparticles and nanotubes. The materials used in the compound anode assist in the reaction that forms product in the arc region of the apparatus. The materials assist either by providing reaction ingredients, catalyst, or affecting the reaction kinetics. Optionally the inventive compound anode may have one or more sets of conduits.

It is an advantage of this invention to provide a reliable means of synthesizing miniature conducting particles and tubes, miniature semiconducting particles and tubes, miniature filters, and miniature structural material.

III. SUMMARY DESCRIPTION OF THE DRAWINGS

FIG. 1: shows a simplified cross-sectional view of an arc-discharge chamber.

Figure 2:
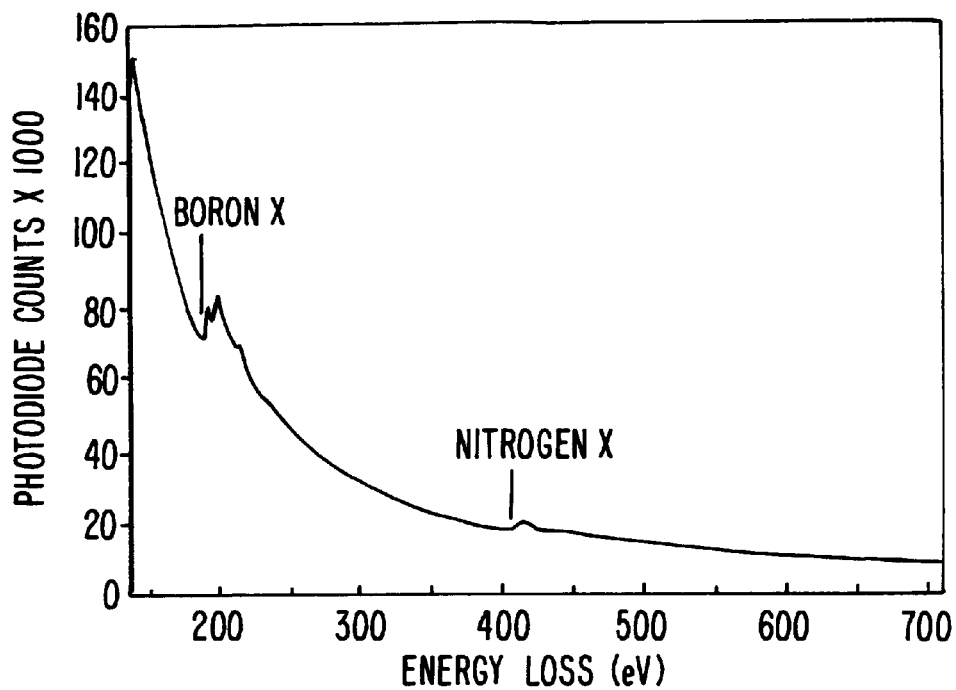

FIG. 2: shows an EELS spectrum of a boron-nitride standard.

Figure 3:
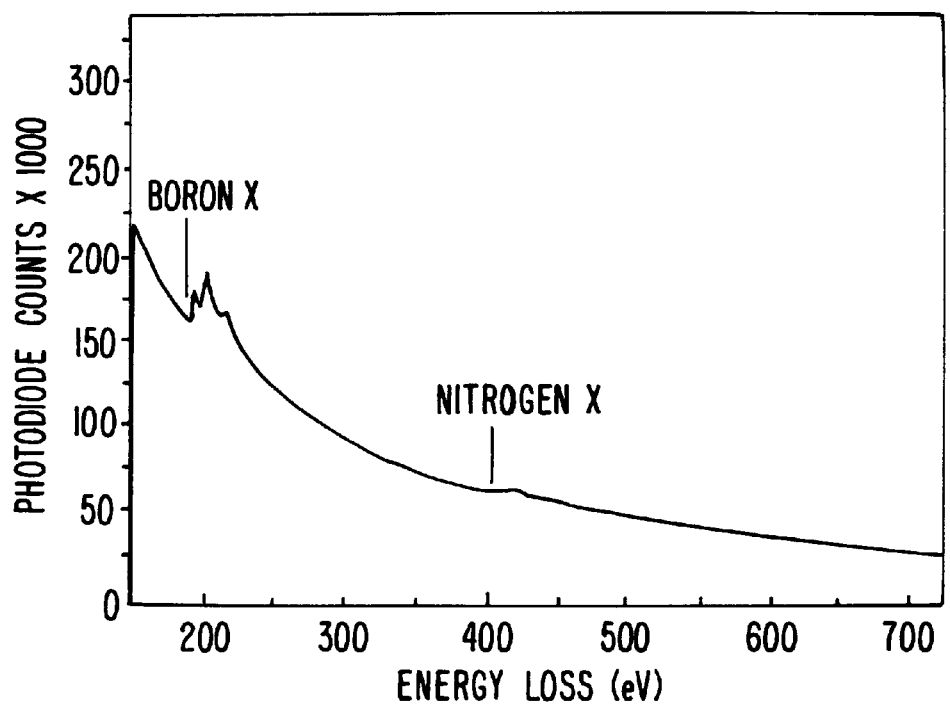

FIG. 3: shows a TEM-EELS spectrum of an individual boron-nitride tube.

IV. DETAILED DESCRIPTION OF THE INVENTION

The term "product" as used herein means the deposit, or some portion of the deposit, that forms as a result of producing an electrical arc between an anode and a cathode in the presence of materials that assist and/or are ingredients in the chemical reaction.

FIG. 1 shows a schematic cross-sectional view of the inventive apparatus and electrodes. An arc-discharge chamber 10 provides a controllable ambient gas environment. Pressure, temperature, volume and composition of the ambient gas can be controlled. The chamber 10 used in the examples below was custom made at the machine shop at the University of California, Berkeley. It can be ordered from a conventional machine shop specializing in vacuum products. A detailed description of the requirements of an arc-discharge chamber can be found in J. P. Hare, H. W. Kroto, and R. Taylor, *Preparation and UV/visible Spectra of Fullerenes C60 and C70*, Chemical Physics Letters, vol. 177, page 394 (1991), herein incorporated by reference. The electrodes 20 and 22 are shown having a first set of conduits 12 for injecting gases into and/or extracting gases from the arc region, and a second set of conduits 14 for efficiently cooling the electrodes. Additionally the anode, electrode 20, has a compound structure. These features are discussed in greater detail below.

Ambient gas is introduced into the chamber 10 from gas source 16. If more than one ambient gas is used more gas sources are also used. The ambient gas acts to modify the kinetics of the reaction that forms the product in the arc region. Two gases used in the examples below were helium and nitrogen. Other ambient gases can be used. The choices are obvious to those of skill in the art and include, for example, any of the noble gases. The type of ambient gas and pressure inside the chamber affect the product synthesized. The chamber pressure was monitored using a standard gas pressure gauge 18. To produce nanotube and nanoparticles, the initial pressure was typically between about 100 and about 1000 torr. In this invention helium was kept near 650 torr. If gas is either added or withdrawn through conduits 12, the pressure in the chamber may change. Similarly, formation of product, or change in temperature can affect the pressure during operation of the inventive apparatus.

Inside the chamber 10 are at least two electrodes. A first electrode is an anode 20. The anode 20 can be placed in various positions. In the present invention, the anode 20 comprises a conducting material. The conducting material can be a metal with a high melting point, such as tungsten or copper. The anode 20 may further have a compound element 21 comprising material that assists in forming a product from arcing the anode against the cathode.

This composite electrode 20 is arced against a second electrode, a cathode 22. The cathode 22 is made of any conducting material, for example, copper. In the present invention, the electrodes 20 and 22 are placed opposite one another.

Additionally, the anode 20 and cathode 22 further comprise concentric feed through conduits 12 in the interior of the electrodes 20 and 22, for injecting material to for extracting material from the arc region. The injected material comprises material that assists in forming a product in the arc region or on the cathode. The injected material may be a constituent material of the product formed by arcing the anode against the cathode. The material may have a fluid or a particulate composition. The first set of conduits 12 connect the arc region 23 to a material reservoir 24. Desirable elements may be injected through the conduits in electrodes 20 and 22 in gaseous, liquid, or particulate form. Elements that may be injected through conduits 12 include particles such as buckyballs; powders such as cobalt, nickel, or yttrium; gas such as nitrogen, helium, or acetylene; or liquids such as benzene. The injected material may comprise a catalyst or may comprise a material that will be an ingredient in the product. Additionally, inert gases may be introduced to change the reaction kinetics. In this apparatus, either the compound anode 20 or the material injected through either of the electrodes 20 and 22 may be the source of material for product formation in the arc region. For example, to produce a product comprising nanotube and nanoparticles of $sp^2$-bonded $B_xC_yN_z$, an electrode may inject into the arc region, a type of gas comprising elements from the group consisting of boron, nitrogen and carbon. In that case, the anode 20 may or may not include the element injected through the conduits 12 of the cathode 22 and the anode 20. In another embodiment, the anode may have a compound structure comprising a graphite rod and a boron nitride section and a gas introduced through conduit may comprise nitrogen. In yet another embodiment, the material injected through conduits in either of the electrodes 20 and 22 may be a catalyst for product formation.

An example of particulate matter introduced through conduit 12 is the introduction of $C_{60}$ particles into the arc region. If heated to more than 400° C. the $C_{60}$ particles can be introduced as a gas.

A source of electrical energy 26 is applied to the anode 20 and cathode 22. The energy must be sufficient enough to generate an arc for forming a deposit inside the chamber 10. The source of energy commonly is a power supply, such as an arc welder power supply. In the present invention, the electrical current is d.c. between 50 A and 200 A with the gap between the electrodes 20 and 22 maintained such that the voltage is between 10 V and 30 V to form an arc.

A variety of different cooling powers for the anode 20 and cathode 22 give favorable results. In the present invention, a second set of conduits 14 in the interior of electrodes 20 and 22 are connected to a fluid supply 28 for special cooling of the anode 20 and cathode 22. The electrodes 20 and 22 are cooled by having a continuous flow of cold fluid typically ranging from room temperature to −196° C., supplied to a cooling core 13 in the electrode interior through the conduits 14. The cooling fluid may comprise any commonly used commercially available coolant, such as, for example, water, liquid nitrogen, ethylene glycol, or other gasses or liquids. The conduits 14 are configured to introduce the coolant from its source 28, near the hot end of the electrode and to extract it from the cooler end via exit port 14'.

When the arc is generated in the presence of a compound anode comprising graphite, boron, and nitrogen, in the presence of either helium gas, or more preferably nitrogen gas, a product forms which contains nanoparticles and nanotubes based on compounds of layered $sp^2$-bonded $B_xC_yN_z$. The nanoparticles and nanotubes formed within the product deposited on the cathode comprise individual particles and tubes having inner diameters on the order of nanometers. Concentric structures have diameters ranging from several angstroms to thousands of angstroms, and tube lengths have been found between tens of angstroms and longer than 100 microns.

As illustrated in the following examples, a number of different electrode-type, arc current, injected gas type, and ambient gas pressure configurations give favorable results when producing the nanometer scale particles and tubes.

Many tubes and particles have been synthesized and imaged having a variety B:C:N ratios. The stoichiometry of the individual structures was determined by electron energy loss spectroscopy (EELS) analysis. FIG. 2 shows an EELS spectrum of a BN standard. FIG. 3 shows a TEM-EELS spectrum of an individual boron-nitride tube. The boron absorption edge at approximately 180 eV and the nitrogen absorption edge at approximately 400 eV are clearly resolved. Further analysis of EELS spectrum reveals that the tube has the stoichiometry of BN.

The following examples disclose three stoichiometries of $B_xC_yN_z$ that have been characterized from the product formed using the inventive apparatus and electrodes. Several of these products of the inventive apparatus are more fully described in copending application serial # (to be assigned) and incorproated herein by reference. In addition many other stoichiometries have been produced and are currently being analyzed.

EXAMPLE 1

Fabrication of Nanotubes and Nanoparticles Containing Carbon

The inventive apparatus has been used extensively to form nanotubes and nanoparticles comprising $B_xC_yN_z$, where x, y, and z indicate the amount of each element relative to the others. Structures containing carbon are those in which y≠0. Either x or z may be 0. The inventive apparatus was used to synthesize two theoretically predicted structures. The product formed in the apparatus was characterized using transmission electron microscopy (TEM) and electron energy loss spectroscopy (EELS). Two of the structures found were formulations where are x=1, y=3, and z=0, i.e. $BC_3$, and x=1, y=2, and z=1, i.e. $BC_2N$.

Synthesis of $B_xC_yN_z$ nanotubes and nanoparticles was carried out using the inventive apparatus and electrodes. Anode rods of varying structure and B—C—N composition were prepared, and subsequently arced against spectroscopically pure graphite cathodes in a helium gas environment. Spectroscopically pure graphite is a common trade designation for level of purity. A number of anode-types, arc currents, and helium pressure combinations were investigated. In one example that yielded high-quality product, a high purity graphite rod (about ¼" diameter) was center drilled to slip-fit a high purity, hot pressed BN rod (about ⅛" diameter) inside. This composite rod comprised the anode 20 and was arced next to a larger (about ¾" diameter) graphite cathode 22 at a d.c. current between about 30 A and about 40 A, provided by a d.c. Lincoln Electric Idealarc 250 arc welder power supply. The electrodes 20 and 22 can be ordered from any standard supplier of chemicals to laboratories. The chamber was filled with helium at about 650 torr. The arc gap is maintained as close as possible without extinguishing the arc, typically less than about 1 mm. Using this configuration, a deposit formed which contained the $BC_3$ and $BC_2N$ tubes and particles. This is described in greater detail in a paper by Z. Weng-Sieh et al., Synthesis of $B_xC_yN_z$ nanotubules, Phys Rev B, v 51, 11 229, Apr. 15, 1995, incorporated herein by reference.

The deposits were analyzed by TEM imaging and by recording EELS spectra, which were fit to boron, carbon, and nitrogen standards. The EELS analysis was used to determine that the stoichiometry, which was found to be $BC_3$ and $BC_2N$ tubes, (Weng-Sieh et al., Phys Rev B, 51(16): 11229, 1995), incorporated herein by reference. TEM images show multi-wall, concentric and crystalline particles and tubes.

EXAMPLE 2

Nano-Scale Tubes and Particles without Carbon

One of the theoretically predicted groups of structures from the group comprising $B_xC_yN_z$, where x, y, and z are integers, are those in which y=0, i.e., $B_xN_z$. The inventive apparatus can be used to synthesize structures from this group. Specifically, the structure having x=1, y=0, and z=1, that is, BN was synthesized using the present invention.

To synthesize non-carbon-containing nanometer scale structures, i.e., $B_xN_z$, procedures similar to those described in the above example were used. To avoid the possibility of carbon contamination, no graphite components were used in the apparatus for the synthesis of BN. The insulating nature of bulk BN prevents the use of essentially pure BN electrode. Instead, compound anode 20 was formed by inserting a pressed rod of hexagonal BN, 3.17 mm in diameter into a hollow tungsten electrode, having an outer diameter of 6.3 mm. The cathode comprised a rapidly cooled copper electrode. In another experiment the anode 20 was formed by inserting pressed rod of 99.5% insulating BN and having about ⅛" diameter into a hollowed out piece of ¼" tungsten (o.d. ¼", i.d. ⅛") and arcing the resulting electrode against a water-cooled 1⅛" (o.d.) copper cathode 22 in the arcing chamber. In another emobodiment, the BN used in the compound electrode may be have a purity of only 90%. A purity as low as 50% is workable but the contaminants may adversely affect the product. The tugsten portion of the of the compound electrode is preferably 99.99% pure. Alternatively the tungsten may be as low as 90% pure. Lower levels of purity risk contamination of the product. In one experiment, a tungsten cathode was used because it has a high melting point and it was thought it would keep the arc stable, however, copper gave more satisfactory results. Additionally, other electronically conducting materials may be used. The initial helium pressure inside the chamber, which is preferably kept between about 10 and about 1,000 torr, was approximately 650 torr and the current setting on the Lincoln Electric Idealarc 250 welder was set between about 50 A and about 200 A. The gap between the electrodes 20 and 22 was maintained such that the voltage was between about 10 and about 30 V. Alternatively, the voltage can be maintained between about 10 V and about 60 V, depending on conditions. Further, the voltage can be maintained between about 15 V and about 35 V. In some runs, the dc current was ramped from about 50 to about 140 A to maintain a potential drop between about 10 and about 30 V between the electrodes. Alternatively, the dc current can be ramped between different values, for example between about 30 amps and about 60 amps. Due to the extremely high temperatures in the arc, chunks of molten tungsten were found in the chamber along with soot. Although there was no deposit on the negative electrode, as there was in the case of carbon, an analysis of the dark gray soot collected on the copper electrode revealed a variety of multi-shelled structures, including tubes and particles of boron-nitride. After the arcing was complete, pieces of solidified tungsten were found spattered inside the chamber, indicating that the temperature at the anode during synthesis exceeded 3700° K., the melting point of tungsten. This experiment is described in more detail in an article by N. G. Chopra et al., Boron Nitride Nanotubes, Science, 269:966, Aug. 18, 1995.

Samples of the soot were mounted on holey carbon grids obtained from the Ted Pella Company. Transmission electron microscopy (TEM) was performed using a JEOL 200CX with 200 keV accelerating voltage. Tubes were found in the soot sample among a variety of other nanometer scale structures.

As an alternative method, gases containing at least one of the elements from the group comprising boron and nitrogen, may also be injected through conduits 12 into the arc region to assist in production of particles and tubes having diameters on the order of nanometers, and based on compounds of $B_xN_z$. These injected gases may be used as a supplement to, or in lieu of, the $B_xN_z$ component of the anode 20. Fine tungsten powder can be injected into the arc region through conduit 12, where it will provide a catalytic function for the reaction.

High-resolution TEM images showed sharp lattice fringes signifying that the walls of the tubes were crystalline; the distance between BN planes was 3.2 Å which was close to the interlayer spacing in sheets of BN. All the tubes were multi-walled with anywhere from about 15 to about 30 layers of BN. The tubules had inner diameters between about 1.5 nm and about 2.5 nm, and total lengths were between about 70 nm and about 250 nm. The length to width ration varied between about 5 nm and about 18 nm. The typical tube had an aspect ration of about 7.

High-resolution electron micrographs revealed some interesting features regarding the ends of the nanotubes. In the case of BN tubes, approximately the same kind of rounded cap occurred on one end of every tube. The other end was capped in one of at least three different ways. The ubiquitousness of the rounded cap on one end suggests that it may act as the nucleation base for tube growth. On the second end, one formation was similar to the widely accepted termination scheme of carbon nanotubes, where a five-membered ring occurs in the wall of the growing tube, made up of six-membered rings. The five-membered ring causes the tube growth to proceed at an angle, eventually closing the tube. In another form of capping, the growing end of BN nanotubes, the flat end may be formed by a four-fold BN bond, that is a bond where each boron is bonded to four nitrogens and vice-versa. Closing the structure with this bond give rise to a number of interesting configurations, including a ball of $B_{12}N_{12}$, which has a diameter of 6 Å, less that that of a buckyball. A third type of cap formation has a bump in the outer layers. This intriguing feature suggested a competition between the van der Waal forces between layers and the existence of a four-fold or five-fold bond at the point of inflection of the bump.

BN configured as nano-scale balls were more prevalent in the deposits than BN configured as nano-scale tubes. High resolution TEM photographs revealed faceted BN balls which had nearly symmetric structures about the axis of the incident electron beam. This structure had over 30 walls, and the dimensions of the inner space were approximately 1 nm by about 2 nm. Some of the balls had a "V" features, unexpected in materials that form large bond angles. The "V" features indicate modified chemical reactivity at the tip. Additionally "V" features are useful in field emission devices (see co-pending application Ser. No. 08/884,450 filed on Jun. 27, 1997, still pending).

Many tubes and particles have been synthesized and imaged having a variety B:C:N ratios. The stoichiometry of the individual structures was determined by electron energy loss spectroscopy (EELS) analysis. FIG. 2 shows an EELS spectrum of a BN standard. FIG. 3 shows a TEM-EELS spectrum of an individual boron-nitride tube. The boron absorption edge at approximately 180 eV and the nitrogen absorption edge at approximately 400 eV are clearly resolved. Further analysis of EELS spectrum reveals that the nanotubes have the stoichiometry of BN.

EXAMPLE 3

Nano-Scale Tubes and Particles without Boron

One of the theoretically predicted groups of structures from the group comprising $B_xC_yN_z$, where x, y, and z are integers, are those in which x=0, for example, CN. The inventive apparatus was used to synthesize tubes and particles composed of CN. A number of different electrode types, arc currents, and gas pressure configurations give favorable results.

For example, carbon and nitrogen may be introduced into the arc chamber by using a composite anode 20, comprised of a conducting material combined with carbon and nitrogen. As an alternative method, gases containing at least one of the elements from the group comprising nitrogen and carbon, may be injected through conduits 12 into the arc region to assist in production of particles and tubes having diameters on the order of nanometers, and based on compounds of $C_yN_z$. These injected gases may be used as a supplement to, or in lieu of, the $C_yN_z$ component of the anode 20.

The total pressure in the chamber was kept at about 500 torr, that is the partial pressure of nitrogen, $P_{N2}$, and the partial pressure of helium $P_{He}$, was about 500 torr. About 100 amps was passed through an anode comprising a section of ¼ inch carbon.

Tubes with stoichiometries of BN, $BC_2N$ and $BC_3$ have been clearly identified. Other tube and particle stoichiometries have been produced in the growth chamber. TEM-EELS analysis of these other stoichiometries are currently being analyzed.

The particles and tubes based on compounds of layered $sp^2$-bonded $B_xC_yN_z$ in accordance with this invention, have unique electrical and mechanical properties. They have a wide range of applications in various industries including electronic and mechanical. Examples of these applications include, but are not limited to, electrical and structural components for computers, sensors, filters, micromachines, chip interconnects, ultra-small scale devices, cables and high strength mechanical fibers, and dry lubricants.

Thus the present invention is an apparatus and method for producing nano-scale tubes and particles. The apparatus comprises novel electrodes for use in arc discharge techniques. The electrodes have interior conduits for delivery and withdrawal of material from the arc region where product is formed. I one embodiment, the anode is optionally made from more than one material and is termed a compound anode. The materials used in the compound anode assist in the reaction that forms product in the arc region of the apparatus. The materials assist either by provided reaction product, catalyst, or affecting the reaction kinetics. Among other uses, the inventive apparatus is used to produce nanotubes and nanoparticles having a variety of electrical and mechanical properties.

While the foregoing detailed description has described several embodiments of the method and apparatus for producing particles and tubes having diameters on the order of nanometers, and based on compounds of layered $sp^2$-bonded $B_xC_yN_z$, in accordance with this invention, it is to be understood that the above description is illustrative only and is not intended to limit the scope of the invention. Particularly included is a device and method in accordance with this invention that produces nanometer scale particles and tubes having the stoichiometry $B_xC_yN_z$. These particles and tubes have unique mechanical and electrical properties. It will be appreciated that various methods to produce various shapes and stoichiometries fall within the scope and spirit of this invention as described in the claims set forth below.

Having thus described the invention, what is claimed is:

1. A method for producing nano-scale particles and tubes, comprising the steps of:
   a) providing an ambient gas environment in a vacuum chamber;
   b) providing a first electrode and a second electrode in the chamber wherein at least one of the electrodes has an interior region comprising one or more conduits wherein each conduit connects a fluid source located outside the chamber to a coolant core inside the electrode, the coolant core having a drain through an exit conduit to the exterior of the chamber;

c) moving material through a conduit in the first electrode;

d) cooling the at least one electrode by circulating coolant through the cooling core; and e) applying a voltage between the first electrode and the second electrode, sufficient to generate an arc in an arc region, to form the nano-scale particles or tubes from the material.

2. The method of claim 1 wherein the material moved through the conduit is moved from a reservoir outside the vacuum chamber to the arc region.

3. The method of claim 1 further comprising moving a product formed in the arc region through a conduit in the second electrode to a region outside the vacuum chamber.

4. A method for producing nano-scale particles and tubes comprising BN, $BC_2N$, or $BC_3$, or a combination thereof, comprising the steps of:

a) providing an initial ambient nitrogen gas environment in a vacuum chamber of about 650 torr.

b) providing a compound anode;

c) cooling a cathode by circulating coolant through a cooling core of the cathode;

d) applying a voltage between about 1 and about 100 volts across the anode and the cooled cathode; and e) collecting a product formed in an arc region between the anode and the cathode and deposited on the electrodes.

5. The method of claim 4 wherein the compound anode comprises a rod of boron nitride inserted into a hollow tungsten electrode.

6. The method of claim 4 wherein the compound anode comprises a rod of boron nitride inserted into a hollow graphite electrode.

7. The method of claim 4 wherein the arc region is maintained at less than about one millimeter.

8. The method of claim 4 wherein the applied voltage is between about 10 and about 60 volts.

9. The method of claim 8 wherein the applied voltage is between about 15 and about 35 volts.

10. The method of claim 4 wherein the voltage is applied by ramping a current between the anode and the cathode from about 30 amps d.c. to about 60 amps d.c.

11. The method of claim 4 wherein the voltage of between about 10 and about 30 V is applied to the electrodes by ramping a current between about 50 to about 140 amps.

12. A method for producing nano-scale particles and tubes, comprising essentially materials chosen from the group comprising BN, $BC_2N$, or $BC_3$, or a combination thereof, comprising the steps of:

a) providing an ambient gas environment in a vacuum chamber;

b) providing a compound anode wherein the compound anode comprises a rod of boron nitride inserted into a hollow first electrode; and c) applying a voltage, between the first electrode and a second electrode, sufficient to generate an arc in an arc region, to form the nano-scale particles or tubes from the boron nitride.

* * * * *